United States Patent [19]

DeMarco

[11] 4,089,098
[45] May 16, 1978

[54] PRYING MACHINE FOR DISMANTLING PALLETS AND THE LIKE

[76] Inventor: Charles C. DeMarco, 10572 Beardsley Cir., Villa Park, Calif. 92667

[21] Appl. No.: 776,643

[22] Filed: Mar. 11, 1977

[51] Int. Cl.² ............................................. B23P 19/00
[52] U.S. Cl. ...................................................... 29/239
[58] Field of Search ....................... 29/239, 252, 401 R, 29/427

[56] References Cited

U.S. PATENT DOCUMENTS

| 3,740,815 | 6/1973 | Campbell | 29/239 X |
| 3,846,890 | 11/1974 | Bielkiewicz | 29/239 |
| 3,899,816 | 8/1975 | Jennings | 29/239 |

*Primary Examiner*—Jimmy C. Peters

[57] ABSTRACT

A machine for prying cross-members loose from their supporting stringers in damaged wooden pallets. A horizontal bed is provided with a plurality of rollers for ease in handling pallets of varied sizes. A superstructure mounted over the bed carries an elongated horizontally disposed rotatably mounted torque bar. A pair of spaced support arms are secured at one of their ends to the torque bar and at their other ends support a rotatably attached pry plate carrier to which are slidably mounted a plurality of curved pry plates. Locking screws secure the pry plates to the carrier at spaced intervals determined by the dimensions of the pallet being dismantled. A first pneumatic or hydraulic ram is connected between the superstructure and a lever bar secured to the torque bar and serves to raise and lower the pry plate carrier. A second ram is connected between the superstructure and a lever arm secured to the pry plate carrier and serves to rotate the carrier and its attached pry plates after they have been inserted through the spaces between the cross-members nailed to the pallet stringers. A plurality of hold-down beams running the width of the bed restrain the pallet against the upward force exerted by the pry plates. These hold-down beams may be fixed or movable vertically.

8 Claims, 5 Drawing Figures

U.S. Patent  May 16, 1978  Sheet 1 of 2  4,089,098
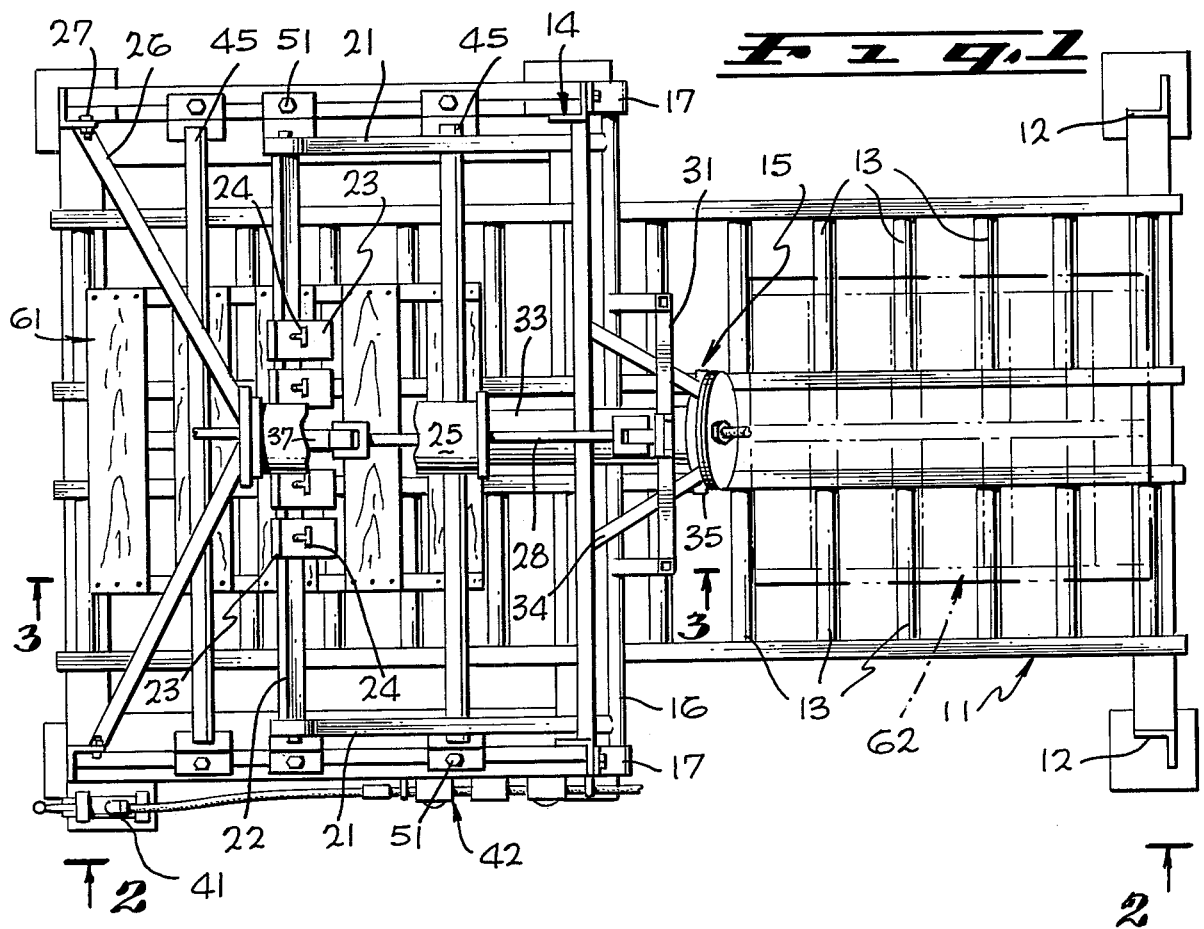
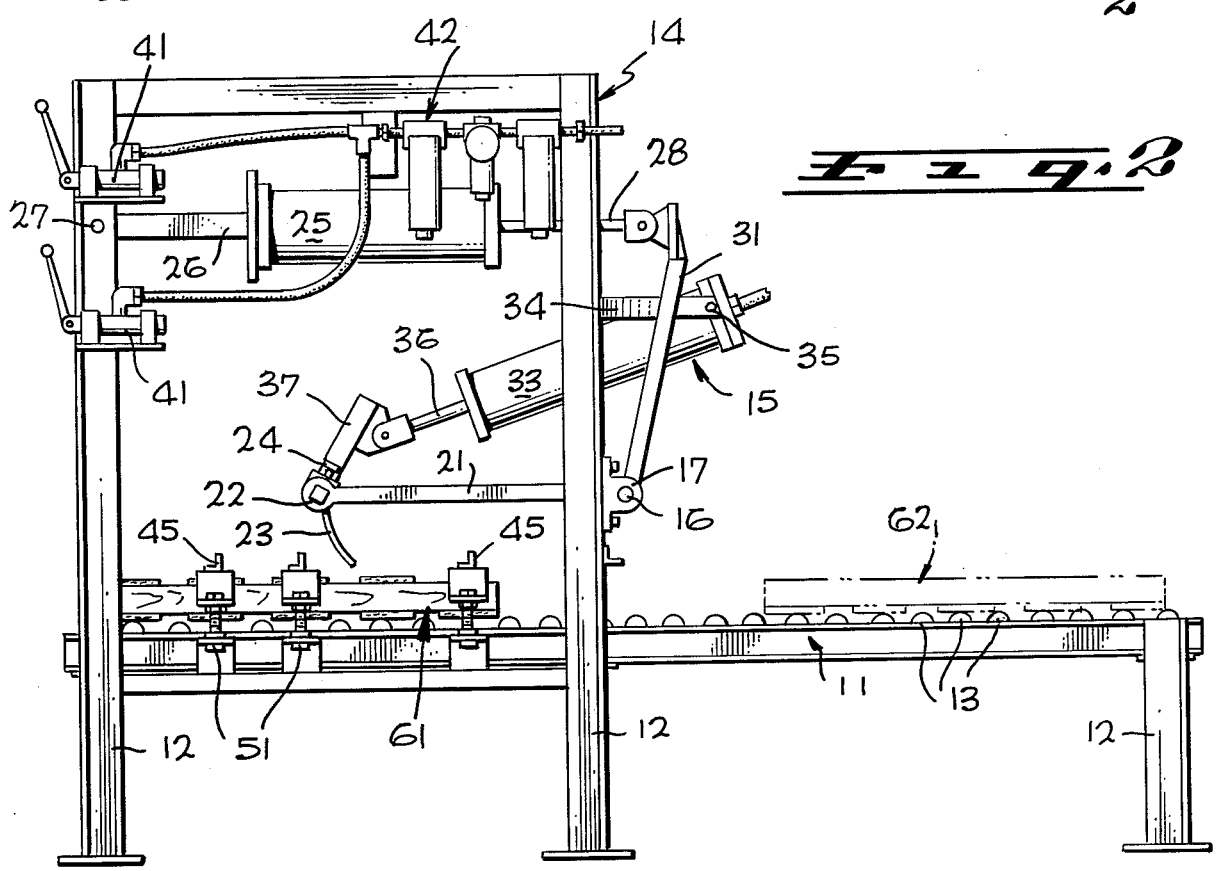

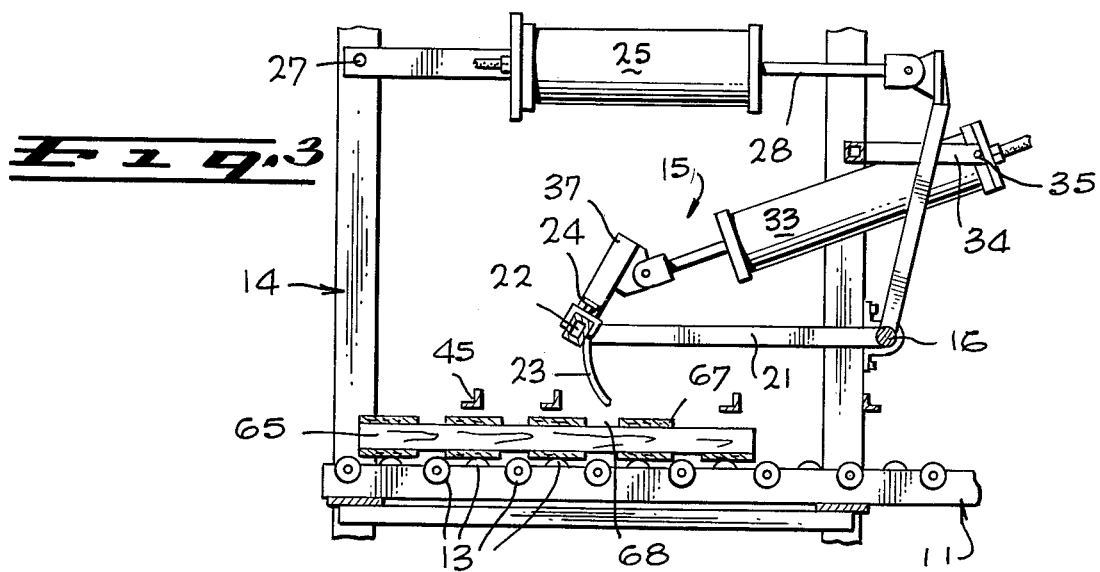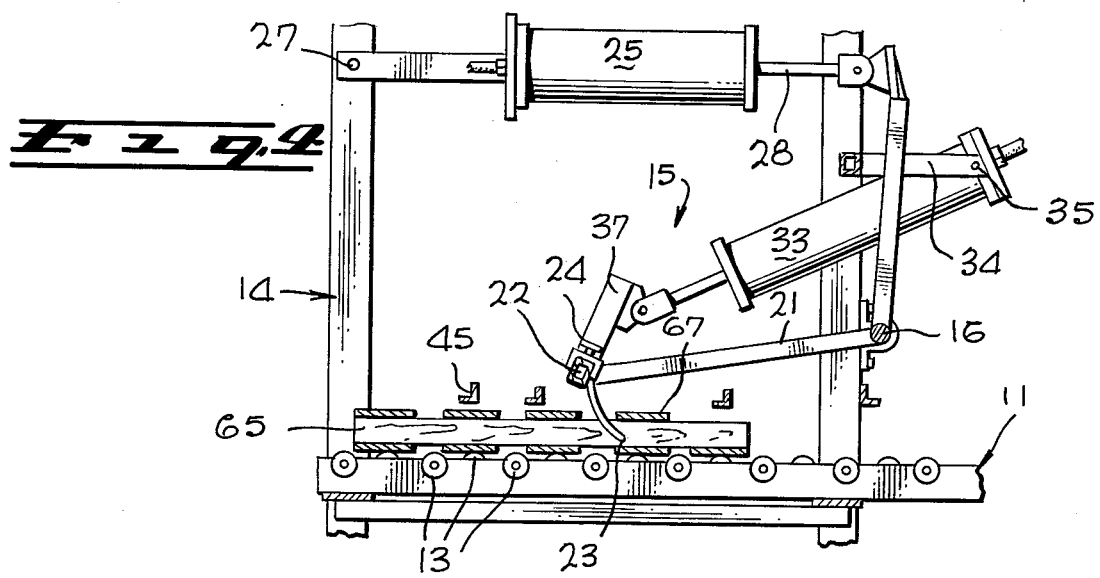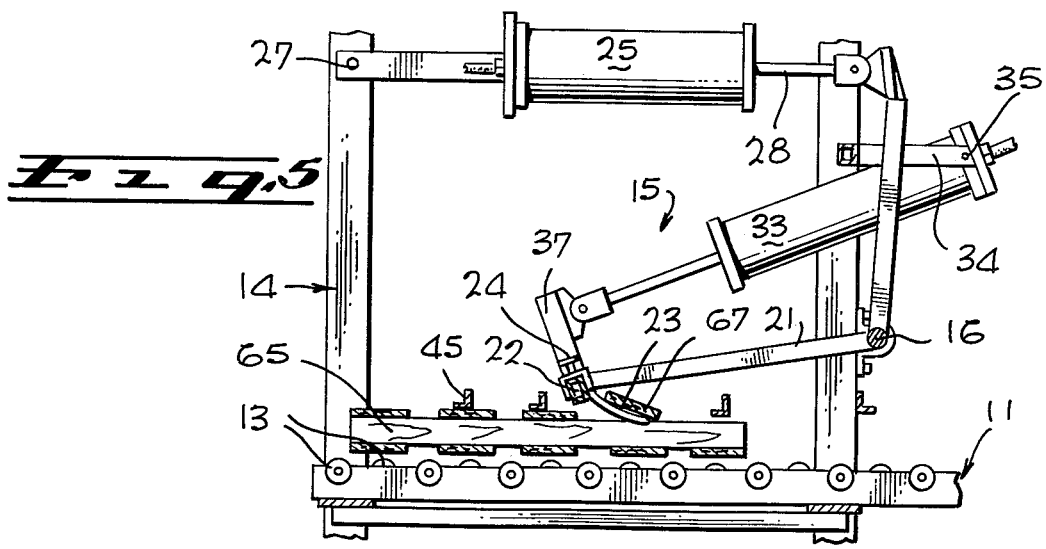

PRYING MACHINE FOR DISMANTLING PALLETS AND THE LIKE

BACKGROUND OF THE INVENTION

1. Field of the Invention

This invention relates to mechanical devices for dismantling wooden pallets by prying the cross-members loose from the pallet stringers to which they are nailed, and more particularly devices of this type wherein hydraulically or pneumatically powered rotatable prying elements are utilized to pry the cross-members from the stringers.

2. Description of the Prior Art

Machinery, equipment, goods, wares and materials of every conceivable kind and description are transported, stored, displayed and even sometimes mounted for operation on wooden pallets. Essentially these pallets comprise a series of boards nailed at intervals to two or more wooden stringers. Often, in heavy use one or more of the cross-members is broken, but the pallet is useable if the broken member can be replaced. Frequently pallets are so badly damaged they cannot be repaired economically, but they still contain valuable lumber which is reuseable if they can be dismantled.

The high cost of labor is rapidly making the use of the conventional hammer and pinch-bar for the removal of broken boards and dismantling of pallets prohibitively expensive. Machines have been devised to perform or assist in these tasks. Some of these devices, such as that shown in U.S. Pat. No. 2,029,885, utilize movable claw-like means to remove individual nails. Others utilize blades or grippers such as those shown in U.S. Pat. Nos. 2,446,741 and 2,704,198 to cut or pull the nails. Still others use a variety of sawing means to cut the nails holding the lumber, or wedging mechanisms to force the lumber pieces apart. None of these machines has proved to be fully satisfactory.

SUMMARY OF THE INVENTION

To overcome the deficiencies inherent in these prior art devices, I have devised a compact, sturdy, easily manufactured and simply maintained machine for prying the cross-members of a damaged wooden pallet loose from their supporting stringers.

The base of the machine comprises a horizontal bed provided with a plurality of rollers upon which the damaged pallet may be rolled into position with ease. A superstructure mounted over the bed carries a horizontally mounted rotatable torque bar to which a pair of spaced support arms are secured. A carrier is rotatably attached to the support arms, and in turn supports a plurality of curved pry plates slidably mounted for spacing to conform with the dimensions of the pallet. Means are provided to lock the pry plates in place on the carrier when they are properly positioned.

A pneumatic or hydraulic ram is connected between the superstructure and a lever bar secured to the torque bar and serves to raise and lower the pry plate carrier. A second pneumatic or hydraulic ram is connected between the superstructure and a lever arm secured to the pry plate carrier and serves to rotate the carrier and its attached pry plates.

Several hold-down beams running the width of the bed are secured to it. The hold-down beams may be fixed or moveable vertically, and in either case are spaced from the rollers and upper surface of the bed to permit the pallet to pass freely under them.

A pallet to be dismantled is placed on the bed and rolled into position under the hold-down beams. The pry plates are adjusted on their carrier and secured in place to avoid the stringers when the pry plates are inserted through the spaces between the cross-members.

The first ram is actuated to lower the pry plate carrier and thereby insert the pry plates into one of the spaces between an adjacent pair of cross-members. The second ram is then actuated to rotate the pry plate carrier and thereby bring the pry plates to bear against the underside of the cross-member to be removed. The hold-down beams restrain the pallet against upward movement, and the force exerted by the ram through the pry plates separates the cross-member from its supporting stringers. Since the pry bars are fairly closely spaced and apply uniform force against the cross-member, generally neither the cross-member nor the stringers are damaged, and once the nails remaining in one or the other of them are removed by conventional means, a substantial amount of the lumber may be reused.

The objects and advantages of the invention will be more readily apparent from the following description of the preferred embodiments illustrated in the accompanying drawings.

THE DRAWINGS

In the drawings, in which corresponding parts are similarly number throughout the views:

FIG. 1 is a top plan view of a prying machine embodying the subject invention;

FIG. 2 is a side elevation of the machine illustrated in FIG. 1 taken in the direction 2—2;

FIG. 3 is a fragmentary section taken in the direction 3—3 of FIG. 1 with the pry plates positioned above a pallet;

FIG. 4 is another view taken in the direction 3—3 of FIG. 1 showing the pry plates positioned between a pair of cross-members; and FIG. 5 is a similar view taken in the direction 3—3 of FIG. 1 showing a cross-member being pried loose from its supporting stringers.

DESCRIPTION OF THE PREFERRED EMBODIMENTS

Referring to FIGS. 1 and 2, a rigid bed 11 is supported by conventional means, such as legs 12, and is provided with friction-reducing bearing means, such as rollers 13. A superstructure 14 is mounted over the bed and either secured to it (as shown) or to the mounting surface to which the bed 11 is mounted. The prying mechanism 15 is carried by superstructure 14.

In its preferred form, this mechanism utilizes a horizontally disposed torque bar 16 rotatably mounted to the superstructure 14 by conventional means such as bearings 17. A pair of rigid spaced support arms 21 are secured at one of their ends to torque bar 16 and at their other ends support a rotatably attached pry plate carrier 22.

A plurality of rigid curved pry plates 23 are slidably mounted on pry plate carrier 22. Locking screws 24 or similar conventional securing means are provided for securing the pry plates 23 to their carrier 22 when the pry plates have been positioned at desired locations at spaced intervals along carrier 22. As will be seen, this arrangement permits the machine to be used with pallets of varying sizes and configurations.

A first hydraulic or pneumatic ram 25 is mounted to the superstructure 14 by conventional means such as braces 26 and bearings 27. The piston rod 28 of ram 25 is connected to a rigid lever bar 31 of generally inverted U-shape having its lower ends rigidly attached to the torque bar. Alternatively, crank or rocker means (not shown) connecting piston rod 28 to lever bar 31 may be used in place of the bearings 27 to compensate for the arcuate motion of lever bar 31.

A second hydraulic or pneumatic ram 33 is mounted to the superstructure 14 by conventional means such as braces 34 and rocker pins 35. The piston rod 36 of ram 33 is connected to pry plate carrier 22 by means of a lever arm 37 rigidly secured to carrier 22. Conventional means other than rocker pins 35 may likewise be used to compensate for the arcuate motion of lever arm 37. Independently operable valves 41 and conventional plumbing 42 connect rams 25 and 33 to a source (not shown) of pressurized hydraulic fluid or compressed air.

A plurality of elongated rigid hold-down beams 45 are secured to the bed 11. In the embodiment pictured, beams 45 are stationary, however, if desired they may be moveably mounted by conventional means allowing them to be positioned at any desired spaced intervals on bed 11.

The beams 45 are elevated above bed 11 sufficiently to permit the pallet 61 being dismantled to pass freely under them. If desired, rather than being of fixed height, beams 45 may be provided with conventional height-adjusting means such as manually operated screw-jacks 51, or more sophisticated powered height-adjusting means.

Preferably the bed 11 extends beyond the superstructure for convenience in handling partially dismantled pallets 62.

FIGS. 3, 4 and 5 illustrate the method of operation of the prying machine shown in FIGS. 1 and 2. A damaged pallet 61 is loaded onto bed 11 at the left side of FIG. 3 and positioned under the prying mechanism 5. Movement of the awkward and relatively heavy pallets is facilitated by the rollers 13.

Generally, a wooden pallet is constructed with a pair of sides 65 and one or more intermediate stringers 66 to which a number of spaced parallel upper and lower cross-members 67 are nailed. Locking screws 24 are released to permit the pry plates 23 to be moved laterally on their carrier 22 for positioning out of vertical alignment with the sides 65 and stringer 66 of pallet 61. Screws 24 are then tightened to secure the pry plates 23 against lateral movement.

Pallet 61 is positioned with the line of pry plates 23 over one of the spaces 68 between adjacent cross-members 67, so that when, as seen in FIG. 4, ram 25 is actuated by means of its associated valve 41, pry plates 23 are inserted through space 68 and under the cross-member 67 to be removed. As seen in FIG. 5, actuation of ram 33 rotates pry plate carrier 22 and brings all of the pry plates 23 to bear on the underside of cross-member 67 with sufficient upward force to urge pallet 61 into contact with the underside of one or more of hold-down beams 45 and, with the pallet 61 restrained by beams 45, to pry the cross-member 67 loose from sides 65 and stringer 66. Reverse operation of rams 33 and 25 returns prying mechanism 15 to the position shown in FIG. 3, permitting the pallet 61 to be relocated for insertion of pry plates 23 into the space 68 between the next pair of adjacent cross-members 67, whereupon the steps outlined above are repeated.

In this manner all of the upper cross-members 67 are effortlessly and quickly removed. Experience has demonstrated that with care, even broken or badly damaged cross-members can easily be pried loose from a single stringer or side piece.

It will be seen from the foregoing description that the prying machine of this invention may be used to remove one or more damaged or broken cross-members from an otherwise useable pallet. If the damage to the pallet is so great that it cannot be repaired, it may be desirable to dismantle it totally for salvage of any good lumber it may contain or for compact disposal. In this event, after all of the upper cross-members 67 have been removed, the partially dismantled pallet 62 is moved to the extension of bed 11 shown in FIGS. 1 and 2 and inverted. The pallet 62 is then reinserted under the superstructure 14 and the previously described procedure used to remove the remaining cross-members.

It will be understood that the particular structure and embodiments shown in the drawings and described here have been selected for illustrative purposes only, and not by way of limitation.

I claim as my invention:

1. A machine for dismantling wooden pallets having spaced cross-members fastened to a plurality of stringers, comprising:

an unyielding bed;
   a rigid superstructure mounted to said bed;
   laterally spaced pry plates mounted to said superstructure transversely of said bed for insertion between adjacent pairs of said cross-members in a pallet positioned on said bed, said pry plates being moveable normally of said bed and rotatable about an imaginery axis spaced from and substantially parallel with said bed;
   at least one rigid hold-down beam secured to said bed and spaced therefrom for passage of said pallet between said beam and said bed; and
   controllable powered means operatively connected between said superstructure and said pry plates for so moving and rotating said plates, and thereby sequentially inserting said pry plates between said adjacent pairs of cross-members and urging said pry plates against one of said pair of cross-members in a direction away from said bed.

2. A machine as defined by claim 1 wherein said hold-down beam is selectively moveable in a direction normal to said bed to vary the spacing between said beam and said bed.

3. A machine for dismantling wooden pallets having spaced cross-members fastened to a plurality of stringers, comprising:

an unyielding bed;
   a rigid superstructure mounted to said bed;
   a pair rigid support arms hingedly mounted to said superstructure at one of their respective ends;
   an elongated pry plate carrier rotatably mounted to the other ends of said support arms;
   at least two pry plates laterally spaced on said pry plate carrier;
   powered means connected between said superstructure and said pry plate carrier controllably moving and rotating said pry plate carrier; and
   a least one rigid hold-down beam secured to said bed and spaced therefrom for passage of said pallets between said beam and said bed.

4. A machine as defined by claim 3, wherein said bed includes a plurality of rollers for supporting said pallet.

5. A machine as defined by claim 3, wherein said pry plates are selectively moveable transversely of said pry plate carrier to vary their lateral spacing.

6. A machine as defined by claim 3, wherein said hold-down beam is selectively moveable in a direction normal to said bed to vary the spacing between said beam and said bed.

7. A machine as defined by claim 3, wherein:
an elongated torque bar is rotatably mounted to said superstructure transversely of said bed;
said support arms are rigidly attached to said torque bar;
said first powered means is connected to said torque bar through a rigid lever bar secured to said torque bar; and
said second powered means is connected to said pry plate carrier through a rigid lever arm secured to said carrier.

8. A machine as defined by claim 7, wherein said first and second powered means include a pair of hydraulic or pneumatic rams.

* * * * *